Sept. 27, 1966   A. R. TOMLINSON   3,275,591
PIGMENTATION OF POLYPROPYLENE FILAMENTS AND FIBERS
Filed May 15, 1961   2 Sheets-Sheet 1

United States Patent Office 3,275,591
Patented Sept. 27, 1966

3,275,591
PIGMENTATION OF POLYPROPYLENE FILAMENTS AND FIBERS
Arthur R. Tomlinson, Garden City, Pa., assignor, by mesne assignments, to FMC Corporation, San Jose, Calif., a corporation of Delaware
Filed May 15, 1961, Ser. No. 110,211
1 Claim. (Cl. 260—41)

The present invention relates to the manufacture of colored artificial filaments and fibers, and more specifically to a method for providing improved dispersion of pigments in fiber forming thermoplastic polymeric materials, and in particular polymers of propylene.

In view of the inherent resistance of isotactic polypropylene to many chemical reagents, including dyes, colored polypropylene filaments and fibers are generally produced by color spinning procedures; that is, by shaping into filaments polymers which have been pigmented. A conventional, and perhaps the most common technique for incorporating pigments into a molten polymer mass is by shearing or tangential stress, resulting from the application of forces which tend to cause contiguous parts of a polymer mass to slide relative to each other in a direction parallel to the planes of contact. With this procedure, dispersion of pigment agglomerates in propylene polymers has been found to be inadequate, thus resulting in the formation of filaments and fibers having poor color value and which were weak or cracked at the points at which pigment agglomerates were located. In addition, the relatively large agglomerates of pigments caused the very fine filters usually employed in multi-filament operations to become rapidly plugged, thus necessitating frequent shutdown of the apparatus for replacement or cleaning of parts. Accordingly, a primary object of the present invention is to provide a new or improved and more satisfactory method for making colored polypropylene filaments and fibers.

Another object is to provide a method for securing pigment dispersions in propylene polymers suitable for multi-filament spinning operations.

These and other objects of the invention will become apparent through the following description and drawing in which.

Briefly, the method of the present invention comprises the steps of dry mixing a pigment with a filament-forming polymer of propylene in powdered form to obtain a generally uniform blend, which is then subjected to a high speed centrifugal milling or grinding action to disintegrate pigment agglomerates. The resulting powdered product is in the form of a concentrate which is substantially free of pigment agglomerates and in which the pigment is well dispersed. At this stage, the powdered product may be blended in a melt mixing device with additional polypropylene polymer to obtain a desired color tone and then spun into filaments. Preferably, the dry powdered mixture are melted, with or without the addition of natural propylene polymers, and pelletized for subsequent use, at which time the pellets are mixed with natural or uncolored pellets of propylene polymer to attain the color level desired. While conventional dry-blending processes do facilitate a generally uniform distribution of pigment particles throughout the mass of powdered polymer, these procedures are not effective in disintegrating pigment agglomerates or particles as is necessary for trouble-free spinning operations and the formation of satisfactory filaments. Therefore, the success of the method of the present invention resides in the impact or high speed centrifugal milling or grinding stage, for once pigment agglomerates have been dispersed the remainder of the operations are restricted only by the capability of evenly distributing the pigmented propylene polymer throughout the added mass of natural polymer prior to spinning of the same.

Figure 1:
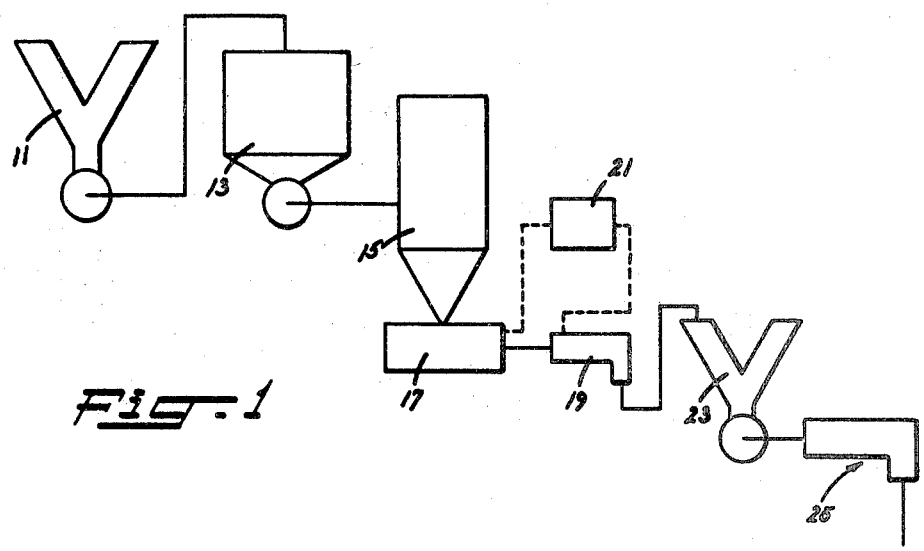
FIGURE 1 is a flow diagram illustrating the steps involved in the practice of the method of the present invention.

Referring to FIGURE 1 of the drawing, initial dry mixing of polypropylene powders and one or more pigment required for a desired color may be achieved, for example, with a conventional drum tumbler device as indicated at 11. A device suitable for use at this stage of the process is a conventional Patterson Kelly Twin Shell Blender, as manufactured by Patterson Foundry and Machine Company of East Liverpool, Ohio. The mixing operation is continued until a generally uniform powdered blend is provided, afterwhich the mixture is passed into an impact device 13, such as a high speed centrifugal milling or grinding device, to effect disintegration and dispersion of pigment agglomerates. Satisfactory disintegration and dispersion of pigment agglomerates has been achieved using an Entoleter Centrifugal Mill as manufactured by Entoleter Incorporated of New Haven, Connecticut which, in general consists of a pair of discs mounted in spaced apart relationship by a series of closely spaced pins and rotated relative to a series of fixed pins. In use, the mixture obtained from the blending apparatus 11 is delivered between the discs as they are together rotated at speeds of up to 3500 r.p.m. (revolutions per minute) whereupon the mixture is centrifugally discharged against both series of pins. In view of the high velocity imparted to the powdered particles of the mixture, the pigment agglomerates are caused to impact against the rotating pins and fixed pins with a relatively large force and are thus disintegrated and dispersed throughout the mixture.

Following the above milling operation, the extremely fine air suspended particles or dust are removed by a collector 15, while the remaining portion of the mixture, hereafter referred to as the masterbatch, is collected at 17. The powdered masterbatch may be passed directly to an extruder 19 where it is fused and shaped into pellets. If desired, the color concentration of the masterbatch may be reduced to a desired level by blending the same with natural or uncolored polypropylene powder in a hot mixing device 21 prior to pelletizing of the same.

The resulting masterbatch pellets are in the form of a color concentrate which may be stored for future use or may be passed directly to a mixer 23, such as a Patterson Kelly Twin Shell Blender mentioned above, where they are dry blended with pellets of natural or uncolored polypropylene and then shaped into filaments by a spinning apparatus as indicated at 25. The amount of let-down or dilution of the masterbatch pellets which can be successfully achieved depends upon the uniformity requirements of the final filament or fiber and the mixing capabilities of the processing equipment employed. Let-downs as high as 30 to 1 have been successfully achieved employing apparatus as described above.

It will be of course understood that masterbatch pellets of different colors may be dry blended together prior to or along with pellets of natural polypropylene to obtain a desired shade of color. In this manner powder handling problems are minimized, desired shades of color can be easily and rapidly obtained, and accurate control over the color concentration is facilitated whereby corrections can be easily made before actual spinning operations.

As compared with conventional color spinning techniques, and particularly known systems in which pigmentation of the polymer is achieved by developing high shear in the polymer melt, pigmentation of the polypropylene in accordance with the method of the present invention provides greatly improved pigment dispersion thus resulting better utilization of the pigment, less operating difficulties and shut-down of the apparatus and the formation of filaments and fibers having better physical properties. An added advantage is that the method of the present invention is not dependent upon the particular characteristics of the particular polymer employed. Thus, while conventional melt blending techniques require polymers having relatively high molecular weights in order that adequate shear may be developed in the mass being blended, the method here described is in no way limited by such consideration.

As heretofore mentioned, the most critical stage of the method of the present invention is the impact or high speed centrifugal milling or grinding of the powdered polymer and pigment mixture to secure disintegration and dispersion of the pigment agglomerates. Once such pigment dispersion has been achieved, the remaining steps of the method are limited only by the ability of evenly distributing the dispersed pigment throughout the polymer mass to insure color uniformity in the articles which are subsequently shaped.

To better illustrate the advantages of the present invention, reference is made to FIGURES 2-9 of the drawing showing filaments formed in accordance with the following examples photographed at a magnification of 750×.

*Example I*

Isotactic polypropylene powder having an intrinsic viscosity of 2.7 and an atactic content of less than 5% was dry blended with 0.5% carbon black (designated as Cabot Monarch 74 Black by the Godfrey L. Cabot Company of Boston, Massachusetts) in a Patterson Kelly Twin Shell Mixer until a generally uniform blend of pigment throughout the mixture was attained. This mixture was then divided into two portions, with only one portion thereof being further treated in an Entoleter Centrifugal Milling apparatus of the type described above. The discs of the centrifugal milling apparatus was rotated at 3500 r.p.m., so that the one portion of the mixture delivered to the apparatus was centrifugally forced against the series of rotating and fixed pins, causing disintegration of pigment agglomerates and dispersion of the same throughout the powdered mass of polypropylene.

Both portions of the mixture were then independently shaped into filaments under substantially identical conditions by advancing the same through a conventional screw extruder heated to a temperature of about 230° C., after-which metered amounts of the polymer melt were delivered to and extruded from a jet having 34 holes of 25 mil diameter and a length-to-diameter ratio of 3.0/1. The jet was surrounded by a heater which projected about ½ inch beyond the jet face and which also was maintained at a temperature of about 230° C. In each case the extruded streams of colored polymer were quenched below the projecting heater by a flow of cool air moving at a velocity of 110 feet per minute in a direction generally perpendicular to the paths of the extruded polymer streams. The filaments were taken-up at 400 meters per minute to stretch the extruded streams as they passed the heated zone adjacent to the jet and were converted to a solid condition by the quenching air.

Figure 2:
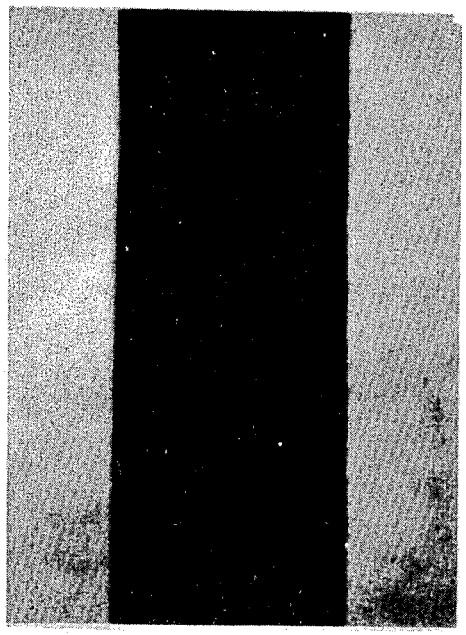
FIGURE 2 is a microphotograph of a filament formed of a propylene polymer blended with carbon black in accordance with conventional procedures.
Figure 3:
FIGURE 3 is a microphotograph showing cross-sections of filaments of the type illustrated in FIGURE 2.
Figure 4:
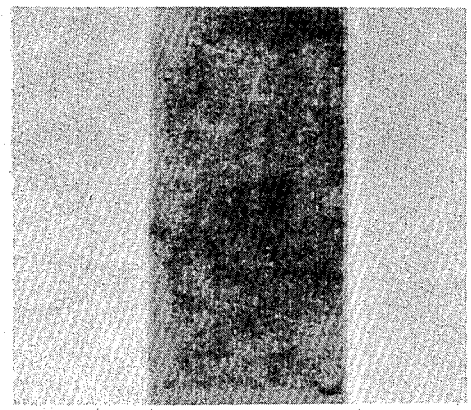
FIGURE 4 is a microphotograph of a filament formed of a propylene polymer which had been pigmented with carbon black in accordance with the present invention.
Figure 5:
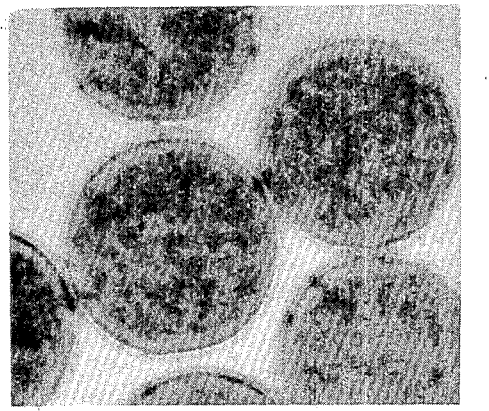
FIGURE 5 is a microphotograph showing cross-sections of filaments of the type illustrated in FIGURE 4.

Microphotographs of the filaments formed from that portion of the mixture as received from the Patterson Kelly Twin Shell Mixer are shown as FIGURES 2 and 3 of the drawing while similar photographs of filaments formed from the portion of the original mixture which received further milling are shown as FIGURES 4 and 5. In comparing these photographs, and in particular the photographs of FIGURES 3 and 5, it will be noted that the filaments shown in FIGURE 5 possess few agglomerates of pigment and are much darker and more uniformly colored thus giving positive evidence of the improved pigment dispersion within the polymer as a result of the centrifugal milling operation.

*Example II*

Employing a powdered propylene polymer and the mixing procedure as described in Example I, a generally uniform dry mixture containing 0.5% Monastral Blue B-380 (E. I. du Pont de Nemours and Company) was initially provided. A portion of this mixture was then treated in an Entoleter Centrifugal Milling apparatus in a manner as described in Example I to effect disintegration and dispersion of pigment agglomerates. The remaining portion of the dry-mixture and that portion subjected to milling were then independently shaped into filaments using the apparatus and conditions as set forth in Example I.

Figure 6:
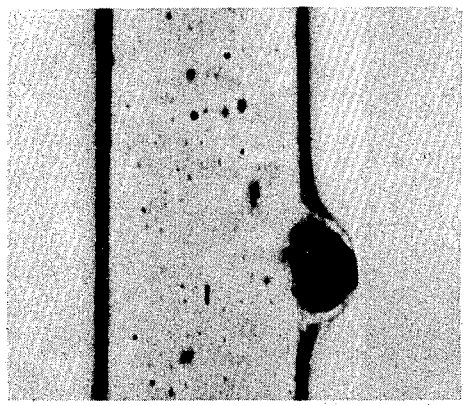
FIGURE 6 is a microphotograph of a filament formed of a propylene polymer pigmented with 0.5% Monastral Blue B–380 in accordance with conventional procedures.
Figure 7:
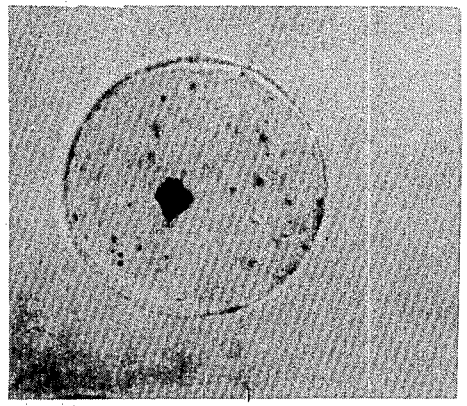
FIGURE 7 is a microphotograph showing cross-sections of filaments of the type illustrated in FIGURE 6.
Figure 8:
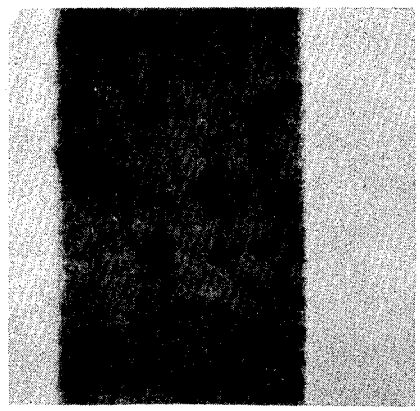
FIGURE 8 is a microphotograph of a filament formed of a propylene polymer which had been pigmented with 0.5% Monastral Blue B–380 in accordance with the present invention.
Figure 9:
FIGURE 9 is a microphotograph showing cross-sections of filaments of the type illustrated in FIGURE 8.

Microphotographs of the filaments formed from the portion of the dry-mixture as originally prepared are shown in FIGURES 6 and 7, while similar microphotographs of filaments produced from the portion of the dry-mixture subjected to centrifugal milling are shown in FIGURES 8 and 9. The relatively large pigment agglomerates projecting from and within the filaments shown in FIGURES 6 and 7 constitute weakened areas at which the filaments are likely to break during further processing. The absence of such pigment agglomerates in the filaments shown in FIGURES 8 and 9, taken with the darker and more uniform shading of such filaments, clearly illustrates the merits of the present invention in securing satisfactory pigment disintegration and dispersion.

It is to be understood that changes and variations may be made without departing from the spirit and scope of the invention as defined in the appended claim.

I claim:

A process for making pigmentated polypropylene filaments including the steps of dry blending a mass of powdered polypropylene with one or more pigments to provide a generally uniform mixture thereof, delivering said mixture in-between a pair of discs which are maintained in spaced apart relationship by a series of spaced pins and which are rotated relative to a series of spaced fixed pins, rotating said discs together at a speed of up to 3500 revolutions per minute to centrifugally discharge said dry-blended mixture from in-between said discs and against both series of pins to disintegrate pigment agglomerates and to disperse the same throughout the mass of polypropylene, blending the pigmented mass of polypropylene with additional uncolored polypropylene to adjust the piment concentration and shaping the resulting pigmented mixture into filaments.

References Cited by the Examiner

UNITED STATES PATENTS

| | | | |
|---|---|---|---|
| 2,109,592 | 3/1938 | Macht et al. | 260—41 |
| 2,497,346 | 2/1950 | Collins | 260—41 |
| 3,030,330 | 4/1962 | Cines et al. | 260—41 |

OTHER REFERENCES

Goodwin: Modern Plastics; August 1954; pp. 104 and 105.

MORRIS LIEBMAN, *Primary Examiner.*

LEON J. BERCOVITZ, *Examiner.*

B. LEON, K. B. CLARKE, J. S. WALDRON,
*Assistant Examiners.*